(12) United States Patent
Borrill

(10) Patent No.: US 8,259,620 B2
(45) Date of Patent: Sep. 4, 2012

(54) SELF-HEALING COMMUNICATION TREES

(75) Inventor: Paul Borrill, Palo Alto, CA (US)

(73) Assignee: Paul Borrill, Palo Alto, CA (US)

( * ) Notice: Subject to any disclaimer, the term of this patent is extended or adjusted under 35 U.S.C. 154(b) by 476 days.

(21) Appl. No.: 12/651,027

(22) Filed: Dec. 31, 2009

(65) Prior Publication Data

US 2010/0165886 A1    Jul. 1, 2010

Related U.S. Application Data

(60) Provisional application No. 61/142,147, filed on Dec. 31, 2008.

(51) Int. Cl.
*H04L 12/28* (2006.01)
(52) U.S. Cl. ................................ 370/256; 709/242
(58) Field of Classification Search .................. None
See application file for complete search history.

(56) References Cited

U.S. PATENT DOCUMENTS 6,937,576 B1 * 8/2005 Di Benedetto et al. ....... 370/256
7,177,946 B1 * 2/2007 Kaluve et al. ................ 709/242

OTHER PUBLICATIONS

Authorized Officer Stylianos Vasilakis, International Search Report for International Application No. PCT/US2009/069934, mailed Mar. 10, 2010, 18 pages.
Radia Perlman, Donald Eastlake, Dinesh G. Dutt, Silvano Gai, Anoop Ghanwani, "Rbridges: Base Protocol Specification," <draft-ietf-trill-rbridge-protocol-10.txt>, Trill Working Group, Internet Engineering Task Force, Internet Society (ISOC) 4, Rue Des Falaises Ch-1205, Geneva, Switzerland, vol. trill, No. 10, Nov. 2, 2008, 86 pages.

* cited by examiner

*Primary Examiner* — Xavier Szewai Wong
*Assistant Examiner* — Leon Andrews

(57) ABSTRACT

Systems, methods, and apparatus, including computer program products, implementing protocols for building and maintaining multiple trees in a network and using the trees to route messages through the network. A node in the network initiates the building of a tree having itself as the root, and nodes in the network generally maintain representations of multiple trees, each tree having a distinct node as its root. A node can use the trees to route messages to the root nodes by sending the messages through root-ward ports for the respective trees.

15 Claims, 10 Drawing Sheets

SELF-HEALING COMMUNICATION TREES

CROSS-REFERENCE TO RELATED APPLICATIONS

This application claims the benefit under 35 U.S.C. §119(e) of U.S. patent application No. 61/142,147, title "Self-Healing Communication Trees," filed Dec. 31, 2008, which is incorporated here by reference.

BACKGROUND

This specification relates to networking protocols, specifically to protocols for building and maintaining multiple "trees" in a network and using the trees to route messages through the network.

Generally speaking, a network consists of one or more nodes joined by one or more links. Graphs are a common abstraction for networking applications. The nodes of the network are considered the vertices of a graph and the links between nodes are considered the edges of the graph.

Various graph theory problems are relevant to networks. For example, the distributed all pairs shortest paths problem requires determining the shortest path between all nodes in the graph (or network). The "shortest path" between two nodes is defined as the path between the two nodes with a lowest path-cost. Path-cost is the sum of the weights of each edge on a path; however, the definition of "weight" can vary.

Several solutions have been proposed to the distributed all pairs shortest paths problem, such as the Bellman-Ford algorithm and Dijkstra's algorithm. However, these solutions are slow to respond to changes in the graph. They also require a "god's eye view" of the graph, i.e., knowledge of all nodes and edges in the graph. This knowledge can be stored, for example, as an adjacency table that lists the neighboring nodes of each node.

SUMMARY

This specification describes technologies relating to maintaining and propagating routing information in a local way in a distributed network of nodes. Using local information, nodes build representations of local portions of trees, where each tree corresponds to a root node, and each distinct tree has a distinct root node. Nodes interact locally to maintain the representations and heal the trees in the event of losing connections with each other, whether because of link or node failures, or otherwise. Distributed representations of trees are maintained in a scalable way that needs no global information about the nodes or links in the network.

Particular embodiments of the subject matter described in this specification can be implemented to realize one or more of the following advantages. Tree-building messages are immediately acknowledged by the receiving node. A tree can be built from intermediate replies without waiting for replies from remote nodes. The need for knowledge of state of remote nodes is minimized. The trees can be used to route messages before the trees are completed.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

This specification describes systems and methods that determine a best way to route messages through links between one or more nodes in a distributed network of nodes. A distributed network is one where there are no simultaneously observable global states, only local states. Each node can determine its own state relative to the network but does not have a god's eye view of the network.

In some implementations, the network has an underlying infrastructure ("resiliency web") which locally manages the physical and logical links, e.g., by determining whether a link is up or down. For example, the status of a physical link can be determined through hysteresis and the status of a logical link can be determined with heartbeats or beacons. The resiliency web can also monitor additional information about the links, for example, how long it takes for a message to be passed through a given link and how reliable a given link is. The resiliency web is a local source of information about each link.

Each node executes a message routing protocol to route messages through the system. The protocol tries to minimize the cost of routing a message by sending the message on the shortest path to its destination node.

To support the message routing protocol, a tree-growing protocol constructs and maintains a set of "trees" where each tree is rooted on a distinct node in the network and spans the set of all nodes in the network that have been reached from the root node. The protocol constructs and maintains a tree for each node in the network and guarantees that each tree is connected and acyclic, even in the presence of arbitrary insertions and deletions of links between nodes. The protocol grows each tree outward from the root node using recursive message exchanges between neighboring nodes. The protocol does not require prior knowledge of the total number of nodes or links in the network and can form an acyclic tree without receiving responses from all nodes in the network.

Figure 1:
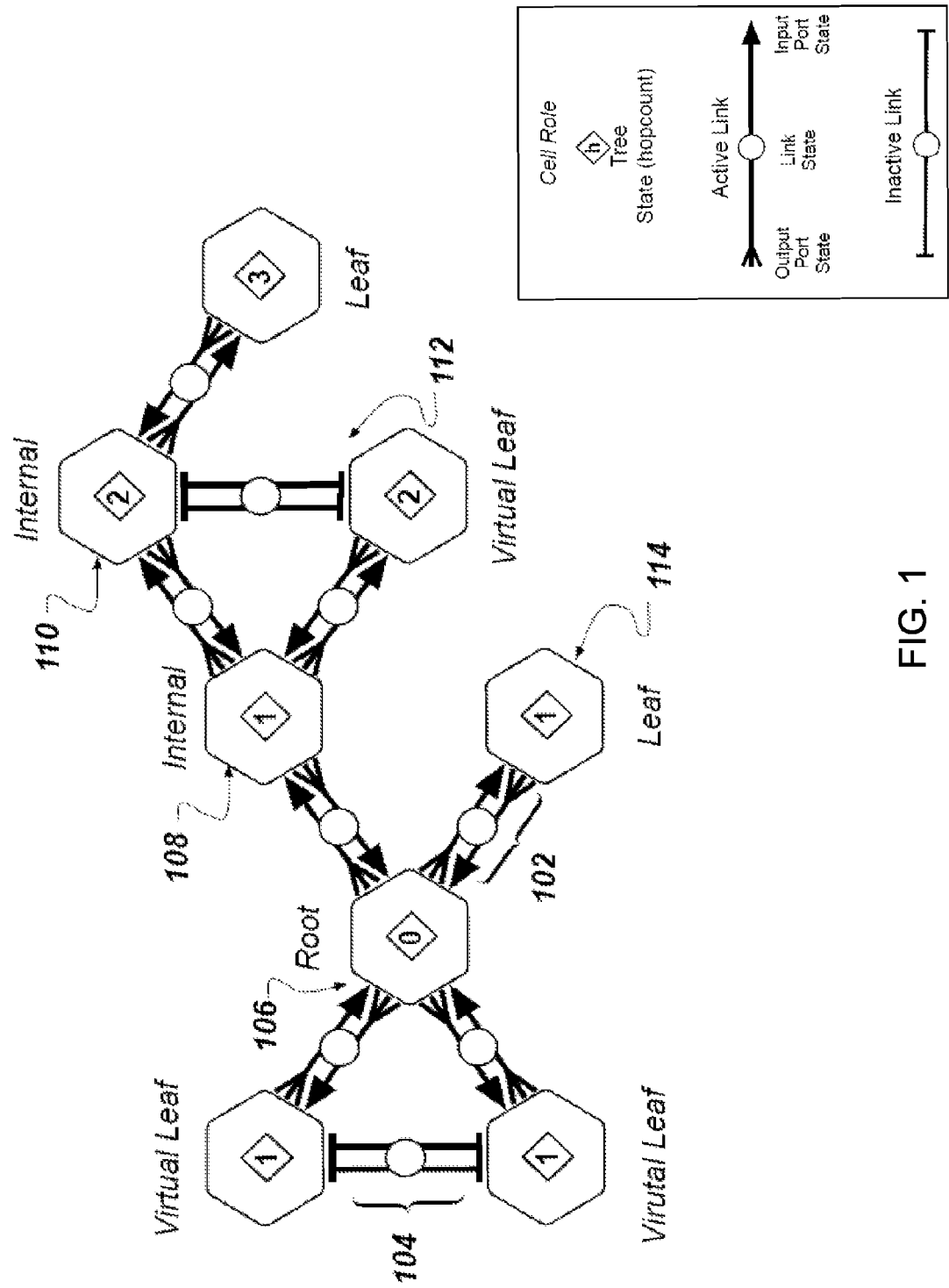
FIG. 1 illustrates an example network of nodes.

FIG. 1 illustrates an example network of nodes.

Nodes are connected through links between their active ports (for example, the link 102 between the root node 106 and a leaf node 114). Neighboring nodes are directly connected by a link. An active port is a port on an active link, i.e. a link through which messages are being sent to and received from a neighboring node. Nodes pass messages through active links. In some implementations, a buffer, such as a FIFO buffer, for each direction preserves the order of the messages sent in that direction.

Nodes have one of four roles relative to a specific tree: initialized, root, internal, leaf, or virtual leaf. In some implementations, each node maintains a state machine that tracks its current node role relative to each tree. Nodes perform different actions depending on their roles.

A node is "initialized" until it receives a tree-update notification for a given tree. All of the nodes in FIG. 1 have received a tree-update notification for the tree rooted at the root node 106, and thus none are initialized.

A node is a "root" if it initiated the building of the tree.

A node is "internal" if it has a port that leads to the root node and one or more ports that lead to child nodes. For example, in FIG. 1, internal node 108 is connected to the root 108 as well as children nodes 110 and 112. Internal nodes are the intermediate nodes that process the incoming tree-update notifications, send outgoing tree-update notifications to frontier nodes, and send port-status notifications to ports through which tree-update notifications were received.

A node is a "leaf" when it has no children, i.e., it has one active port that leads to the root and no other active ports.

A node is a "virtual leaf" when all of its potential children have selected a path to the root that does not include the node (i.e., its ports have been pruned). Virtual leaves act like leaf nodes except during tree-healing operations.

In some implementations, each node generates an identifier to uniquely identify itself on the network, for example, a globally unique identifier (GUID). Alternatively, some or all of the nodes can include a hardware element with a unique identifier.

Each node maintains tree-specific data for each tree the node is currently aware of. This information can be maintained in a routing table. When a node is made aware of a new tree by the receipt of a tree-update notification identifying the new tree, for example, it can allocate memory for an additional segment in the routing table. When a node receives a notification that indicates that a tree should be deleted it can deallocate the memory for the segment, and removes the segment for the tree from the routing table.

The tree-specific data includes the identifier for the tree, a node state relative to the tree, a port state for each active port, and one or more path-costs representing a cost of reaching the root of the tree through a port. The tree-specific data is further described below.

Each node has a state (e.g., discoverable, reachable, meta-stable, or stable) relative to each tree. As a node receives tree-update notifications and port-status notifications for a tree through its ports, its state transitions between the four states.

Figure 2:
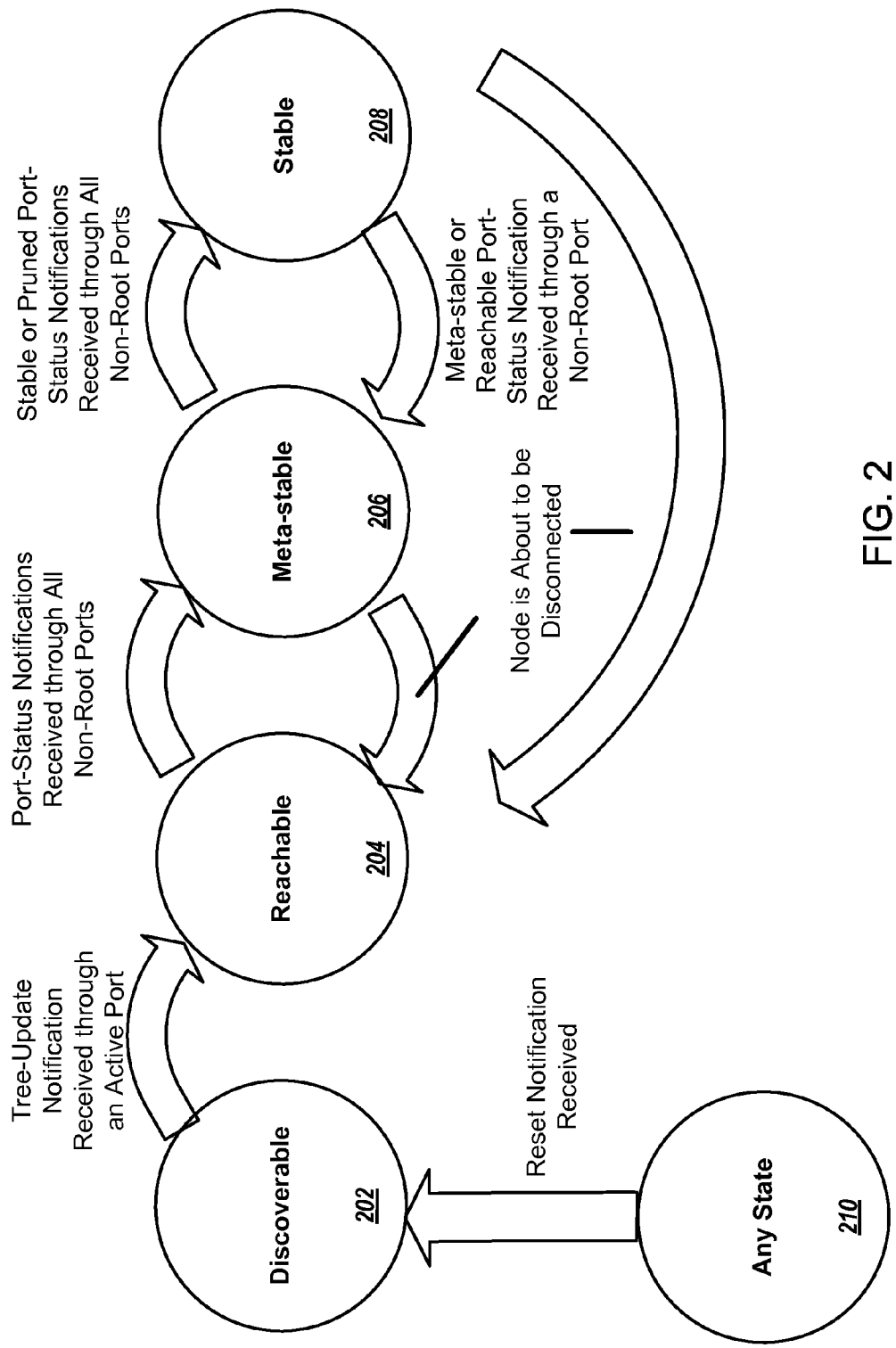
FIG. 2 is a state diagram for a given node for a given tree.

FIG. 2 is a state diagram for a given node for a given tree. A node starts out in the discoverable state 202 for each tree except the tree for which it is a root—for that tree, its state is reachable. The discoverable state is a virtual state—a node is not aware that it is in a discoverable state for a tree until it receives a tree update notification alerting it to the existence of the tree. The discoverable state applies to nodes that have not received a tree-update notification for a given tree but that could receive a tree-update notification for the tree. In other words, if the root of the tree sent out tree-update notifications on the network, at least one tree-update notification would reach the node. Nodes that are not currently connected but could be discovered when they are connected to the tree are also in the discoverable state.

When a node in the discoverable state 202 for a given tree receives a tree-update notification for that tree through one of its ports, its state changes to the reachable state 204.

Once a node in the reachable state 204 for a given tree has received a port-status notification from each of its non-root-ward ports for the tree, the node's state changes to the meta-stable state 206. The meta-stable state indicates the node has identified and confirmed an initial state for each of its active ports, e.g., the node has forwarded a tree-update notification through all of its non-root-ward ports for the tree and has received a port-status notification in response to its tree-update notification from each of its neighboring nodes. Nodes in the meta-stable state have only one root-ward port at any time (thus guaranteeing that the tree is acyclic). They can perform certain "safe" communication functions that do not require a node to be in a stable state.

The meta-stable state is meta-stable rather than stable because it is possible for tree-update notifications representing a path to the root with a lower path cost to arrive on the node's ports, causing the node to reconfigure its ports.

When a node in the meta-stable state 206 has received a stable or pruned port-status notification from each of its non-root-ward ports for the tree, its state changes to the stable state 208. The stable state indicates the node has identified a stable role for all of its ports based on the responses to the tree-update notifications sent for the tree. The stable state is the final, equilibrium state of the node, and represents the state in which the vast majority of operational communications take place.

The first nodes to enter the stable state in response to a tree-update notification are leaf nodes. The next set of nodes to enter the stable state in response to a tree-update notification are virtual leaves.

A node in the stable state 208 enters the meta-stable state 206 for a given tree if it receives a reachable or meta-stable port-status notification on one of its non-root ports. A node in the stable state 208 or the meta-stable state 206 enters the reachable state 204 when the node is about to be disconnected from the network.

A node transitions from any state 210 to the discoverable state 202 upon receipt of a reset notification.

Figure 3:
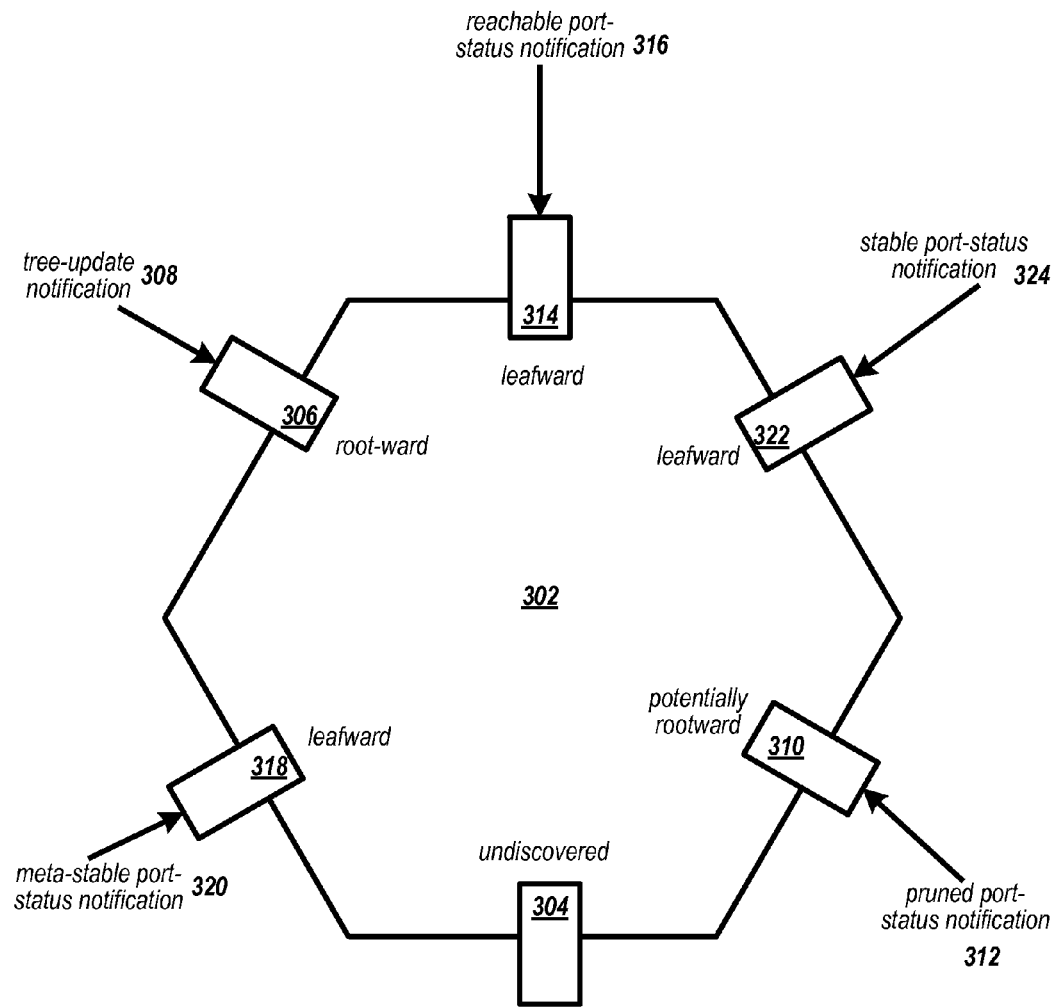
FIG. 3 illustrates the various port states for a given node and a given tree.

FIG. 3 illustrates the various port states for a given node 302 and a given tree. Each active port of a node has one of four states for a given tree: undiscovered, root-ward, leaf-ward, or pruned. The notifications 308, 312, 316, 318, and 328 shown in FIG. 3 are for the same tree and are the last notification received through each port.

Undiscovered ports are ports that are active with regard to a specific tree but have not received a tree-update notification for that tree. For example, in FIG. 3, the undiscovered port 304 has not received any tree-update notifications for the tree.

The root-ward port is the current direction to the root of the tree. The root-ward port has received a tree-update notification for the tree. There can be no more than one root-ward port. Thus, if tree-update notifications for the tree had been received on multiple ports, one root-ward port would be selected, e.g., by selecting the port with the lowest path-cost to the root. In FIG. 3, the root-ward port 306 has received a tree-update notification 308.

A pruned port has received a pruned port-status notification indicating that the node connected through the port did not choose the current node as its parent (i.e., because the node connected through the port already had a lower-cost or same-cost path to the root). For example, in FIG. 3, the pruned port 310 has received a pruned port-status notification 312. Pruned ports represent cross-connections in the tree and are the preferred "standby" ports in case the current root-ward direction is lost.

Leaf-ward ports are ports that lead toward a leaf of the tree (i.e., to nodes that have acknowledged that the current node is their parent). Acknowledgement can come as one of three types of port-status notifications: reachable, meta-stable, or stable. For example in FIG. 3, leaf-ward port 314 has received a reachable port-status notification 316, leaf-ward port 318 has received a meta-stable port-status notification 320, and leaf-ward port 322 has received a stable port-status notification 324.

Each node maintains a path-cost for at least one path to the root for each tree it is aware of. In some implementations, a path-cost is maintained for the path through the root-ward port. In some implementations, a path-cost is maintained for each potential path to the root (i.e., for the paths through root-ward and pruned ports). In some implementations, the path-costs of the paths to the root through one or more ports are used to maintain an ordering of the ports.

Different estimations of path-cost can be used. Different estimations can be used individually, or in any combination, to estimate the path-cost for a given path from a node to the root of a tree.

In some implementations, a hopcount weight is used. The hopcount weight represents the number of links on the path from the root to the current node. The hopcount is set to 0 by the root node and stored, for example, in a tree-update notification sent by the root node. The hopcount is incremented by 1 by each node that forwards the tree-update notification.

In some implementations, an availability weight is used. The availability weight is the sum of the link availabilities of each link on the path from a node to the root. In some implementations, link availability is the ratio of lost messages to all messages sent through a link. The local link availability can be computed in the resiliency web and presented as a maximum and/or average value to the node. Whether the maximum or average value is used can be determined by a policy parameter, for example, in the tree-update notification.

In some implementations, a latency weight is used. The latency weight is the sum of the link latencies of each link on the path from the current node to the root node. In some implementations, the link latency is the time it takes for messages to pass through a link. The local link latency can be computed in the resiliency web and presented as a minimum and/or average value to the node. Whether the maximum or average value is used can be determined by a policy parameter, for example, in the tree-update notification.

In some implementations, a tree load weight is used. The tree load weight is the sum of the number of trees allocated to link on the path from the current node to the root. The tree load can be computed in the resiliency web, for example, by incrementing a counter each time a node sets a port on the link to root-ward for any tree and decrementing the counter each time a node sets a port on the link to a state other than root-ward for any tree. The tree load weight can be used to spread the trees evenly across all the available links in a node to provide maximum resilience against breaks in the network.

In some implementations, a traffic load weight is used. The traffic load weight is the sum of the link traffic loads of each link on the path from the current node to the root. The traffic load can be computed in the resiliency web, for example, by dividing the amount of traffic passing through the link by the total link capacity. The traffic load can be computed for various time periods, for example, the prior 1, 10, 100, or 1000 seconds. The traffic load weight can be used to balance the load through multiple links.

In some implementations, the cost of operating or renting the link is used. This allows the system to dynamically adjust the network for the lowest overall operating cost, even when the spot-market cost of bandwidth changes in real-time.

Trees are built as nodes send and receive tree-update notifications and send and receive port-status notifications.

Each tree-update notification includes an identifier of a tree and a from-there cost. The from-there cost is the cost of getting from the node sending the tree-update notification to the root of the tree. In some implementations, the tree-update notification also includes an identifier of the node sending the notification and/or an identification of the port through which the notification is sent. This additional information allows a node to identify loops in the network.

Port-status notifications are sent in response to tree-update notifications. There are four possible port-status notifications: reachable, meta-stable, stable, and pruned. A reachable port status notification is a local acknowledgement of the receipt of the tree-update notification. A meta-stable port status notification is an intermediate response that verifies a choice of the root-ward direction by the neighboring node and is sent once a neighboring node has received port-status notifications for the tree through all of its non-root-ward ports and thus has a meta-stable state. A stable port-status notification is a final response to the tree-update notification that indicates the neighboring node has received stable port-status notifications for the tree from all of its non-root-ward ports, and thus has a stable state. A pruned port status notification is a final response to the tree-update notification which establishes the link as pruned (i.e., the neighboring node has a different path to the root).

Figure 4:
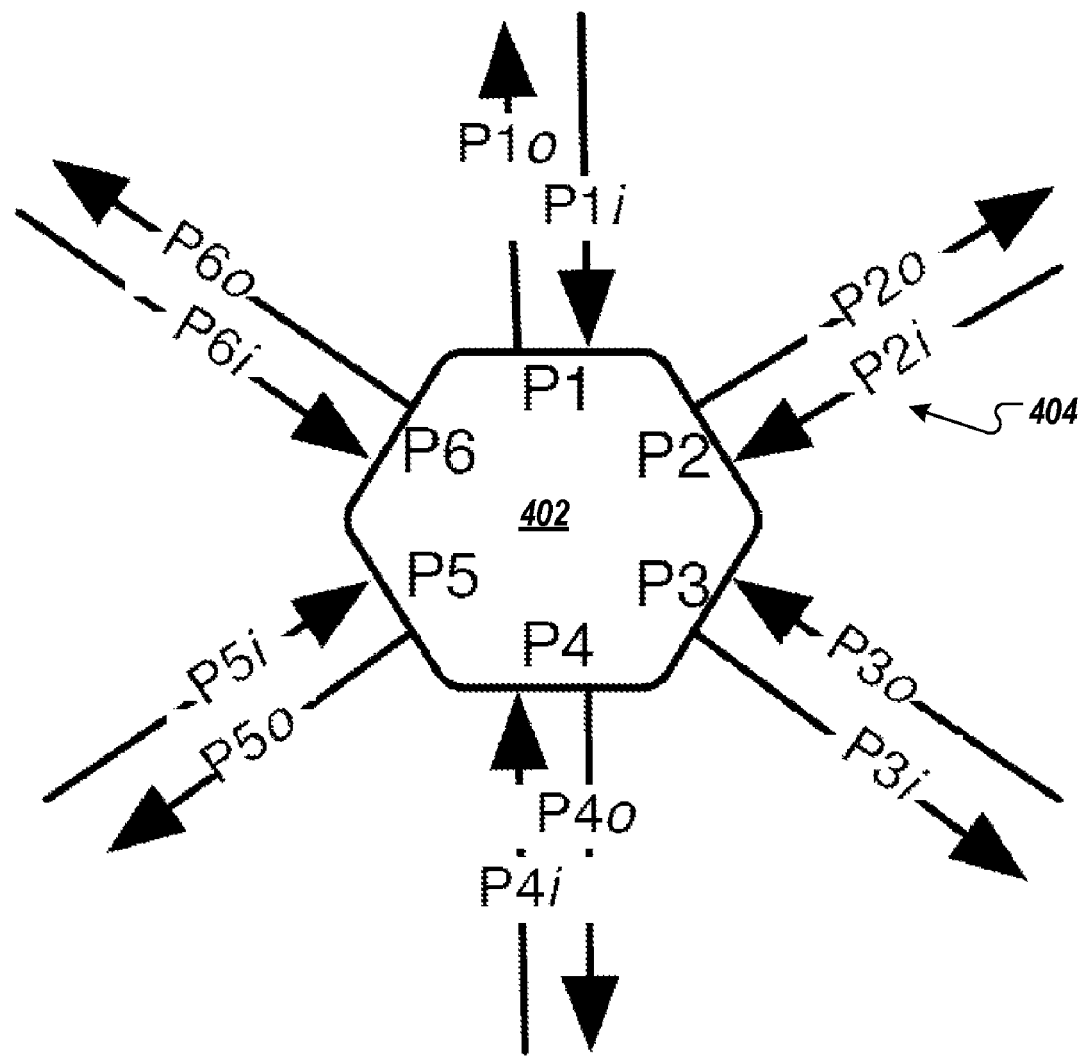
FIG. 4 illustrates a node with multiple ports.

When a node is first initialized, it identifies its ports and may also distinguish the input and output channels of its ports. For example, FIG. 4 illustrates a node 402 with multiple ports including port 404, where each port has an input and an output channel.

The node then begins the process of growing its tree by composing tree-update notifications identifying a tree for which the node is the root and sending the notifications through its active ports.

Trees are grown as each node performs the following operations. A tree-update notification for a tree is received. If a tree-update notification for the tree has not been seen before by this node, then the node allocates or identifies memory for tree-specific data for the tree. The port the tree-update notification came in on is set to root-ward. All other ports are set to undiscovered.

If the node has no other ports, it sets its state for the tree to stable and returns a stable port status notification through its root-ward port.

Otherwise, the node sets its node state for the tree to reachable and sends a reachable port-status notification to the sender of the tree-update notification. The node also sends a new tree-update notification identifying the tree and its from-here cost to all active ports except the port through which it received the tree-update notification. The from-here cost can be, for example, the from-there cost of the original tree-update notification plus the cost of getting to the node from the node that sent the original tree-update notification.

The node then waits for port-status notifications from its non-root-ward ports. When it receives a port-status notification on a port, the node updates its port state for the tree as described above in reference to FIG. 3. Once the node receives port-status notifications from all of its non-root-ward ports, it changes its state to meta-stable. It then sends a meta-stable port-status notification to its new parent (through the port from which it received the first tree-update notification), acknowledging its role as a child on this tree.

The node then waits for all remaining ports to receive port-status notifications indicating a port status of stable or pruned. After receipt of the final stable or pruned port-status notification, the node enters the stable state. The node then sends a port-status notification indicating a status of stable through its root-ward port.

If the tree-update notification is not the first tree-update notification the node has received for the tree, the node chooses one of three courses of action based on the tree specific data and the from-here cost associated with the new tree-update notification. The from-here cost is the from-there cost of the tree-update notification plus the cost of getting to the current node from the node that sent the tree-update notification. If the from-here is greater than or equal to the current path-cost, the node does nothing (e.g., it maintains its current path to the root and does not forward the tree-update notification). If the from-here cost is lower than the current path-cost, but the port the new tree-update notification came in on is already the root-ward port, the node updates the path-cost, sends a tree-update notification to its descendants (identifying the tree and the new path-cost), and waits for port-status notifications as described above. If the from-here cost is lower than the current path-cost and the new tree-update notification came in on a port other than the root-ward port, the node prunes the old root-ward direction, sets the port the new tree-update notification came in to the root-ward port, updates the path-cost to the path-cost through the new port, sends a tree-update notification to its descendants (identifying the tree and the new path-cost), and waits for port-status notifications as described above. Thus, the node strives to maintain the lowest-cost path to the root at all times.

Figure 5:
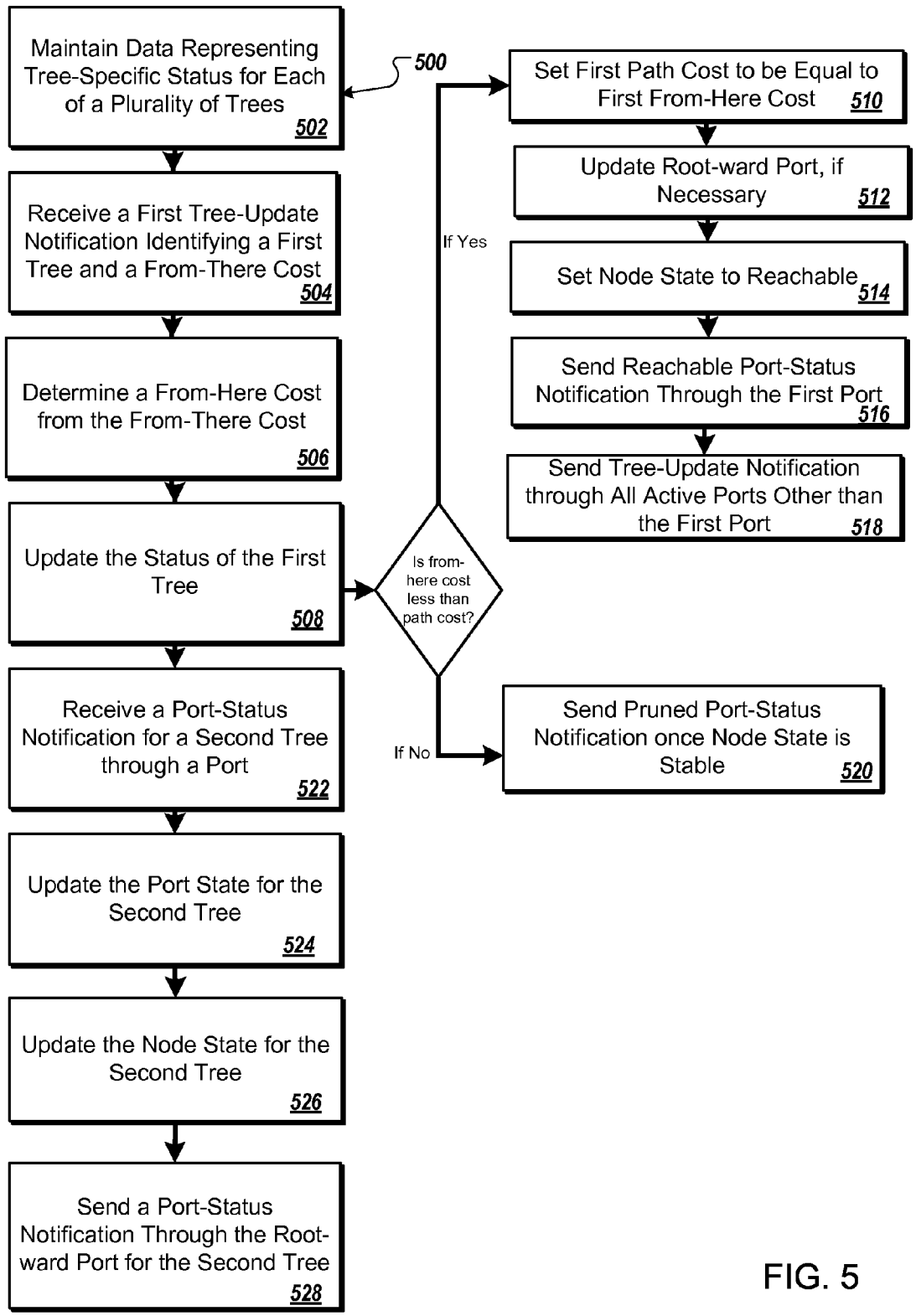
FIG. 5 illustrates a method performed by a node when the node receives a tree-update notification for a tree for which it has already received a tree-update notification.

FIG. 5 illustrates a method performed by a node when the node receives a tree-update notification for a tree for which it has already received a tree-update notification.

In step 502, data representing a tree-specific status for each of a plurality of trees is maintained by the node. This data includes the node state, the state of each of the ports, and a path-cost for each tree, and was described in more detail above.

In step 504, a first tree-update notification is received by the node. The first tree-update notification identifies a given tree and includes a from-there cost. The from-there cost is the cost of reaching the root from the node that sent the tree-update notification to the current node.

In step 506, a from-here cost is determined by the node from the from-there cost of the first tree-update notification. The from-here cost represents the path cost of reaching the root through the port through which the node received the tree-update notification. It is determined by taking the from-there cost and augmenting to further reflect the cost of getting from the node that sent the tree-update notification to the node. The cost is augmented depending on the type of path-cost—for example, if a simple hopcount path-cost is used, then one is added to the from-there cost to get the from-here cost. If a more complicated path-cost is used, information in the resiliency web can be used to help determine the from-here cost.

In step 508, the status of the tree is updated. First, the node checks to see if the calculated from-here cost is less than the path-cost of the node's current path to the root for this tree.

If so, in step 510, the node sets the path-cost to be the from-here cost. The node then checks to see if the port that the tree-update notification was received on is already the root-ward port. If not, then it updates the root-ward port at step 512 by changing the port state of the root-ward port to pruned and changing the state of the port that the tree-update notification was received on to root-ward. At step 514, the node then changes its state to reachable. At step 516, it sends a reachable port-status notification through the port through which it received the port-status notification. At step 518, it sends a tree-update notification identifying the given tree and the from-here cost calculated in step 506.

At step 520, if the calculated from-here cost is not less than the path-cost to the root through the current root-ward port, the node waits until it has a stable state. Once it does it sends a pruned port-status notification through the port through which it received the tree-update notification. The pruned port-status notification indicates that the node has a different path to the root.

In step 522, a port-status notification for a second tree is received by the node through a second given port. The second tree can be the same as the given tree in step 504, but can also be a different tree. The second port can be the same as the port in step 504, but can also be a different port. The port-status notification corresponds to a most recently sent tree-update notification for the second tree (if the notification corresponds to an earlier tree-update notification for the tree, it is ignored).

In step 524, the port state for the second port for the second tree is updated by the node. The port state is set to pruned if the port-status notification indicated a port status of pruned. Otherwise, the port state of the second port is set to leaf-ward.

In step 526, the node state for the second tree is updated by the node. The node state is set to reachable if a port-status notification corresponding to a most recently sent tree-update has not been received through each non root-ward port. The node state is set to stable if a last port-state notification corresponding to the most recently sent tree-update notification received through each non root-ward port indicates a port status of stable. Otherwise, the node state is set to meta-stable.

In step 528, a port-status notification is sent through the root-ward port for the second tree by the node. In some implementations, a port-status notification is sent through the root-ward port for the second tree every time the state of the node for the second tree changes. The port-status notification identifies the second tree and indicates a port status of stable if the node state is stable, a port status of meta-stable if the node state is meta-stable, and otherwise a port status of reachable.

Figure 6:
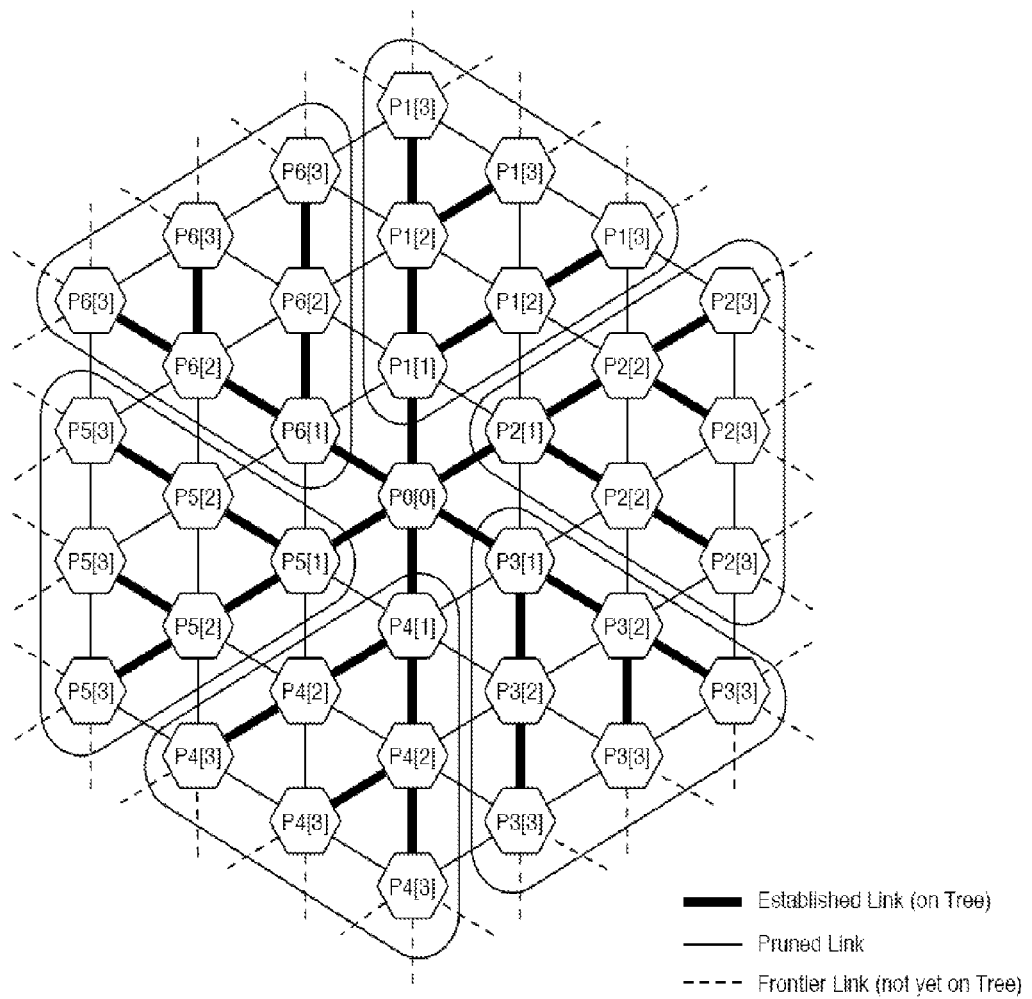
FIG. 6 illustrates one tree as the tree-growing protocol is executed by the nodes.

FIG. 6 illustrates one tree as the tree-growing protocol is executed by the nodes. The thick lines represent established links where the nodes on either side have confirmed their parent-child relationship. The thin lines represent pruned links, where the proposed child node has a better path to the root. The dashed lines represent the frontier of the tree, i.e., those nodes that have not yet received a tree-update notification.

Various changes in the network can necessitate changes to the tree, for example, link connections and disconnections. Link connections can occur, for example, when a new node, never seen by the current node, is connected to the current node, when a node that had been previously disconnected is reconnected, or when a new connection is created between two nodes in the tree. Link disconnections can occur when the connection between two nodes is severed and can be voluntary or involuntary.

As changes are made in the tree, the nodes execute a protocol to try to maintain the following properties. First, the tree remains acyclic. Second, the tree remains reliably connected, i.e., each node returns to a stable state after any change, assuming that the other nodes it is connected to remain reachable. Third, each node has an optimal path to the root (i.e., a minimal path to the root according to a chosen way of measuring path-cost).

When a link connection occurs, a node detects its newly activated port and changes its state from stable to meta-stable for each of its trees. The node then sends a tree-update notification for each of its trees through the newly activated port. The tree-growing process continues as already described as the node waits for port-status notifications through the newly activated port and eventually returns to the stable state.

In some implementations, the sending of tree-update notifications is handled by living tree-notifications, which are digital entities that, once injected into the network, continue to propagate and replicate themselves until they meets some constraint (such as no where else to go). When, a living tree-update notification finds that it does not need to be sent through any more ports of a node, the notification goes to sleep. It is awakened on any events that remove the condition that caused it to go to sleep, such as the insertion of additional links.

Figure 7A:
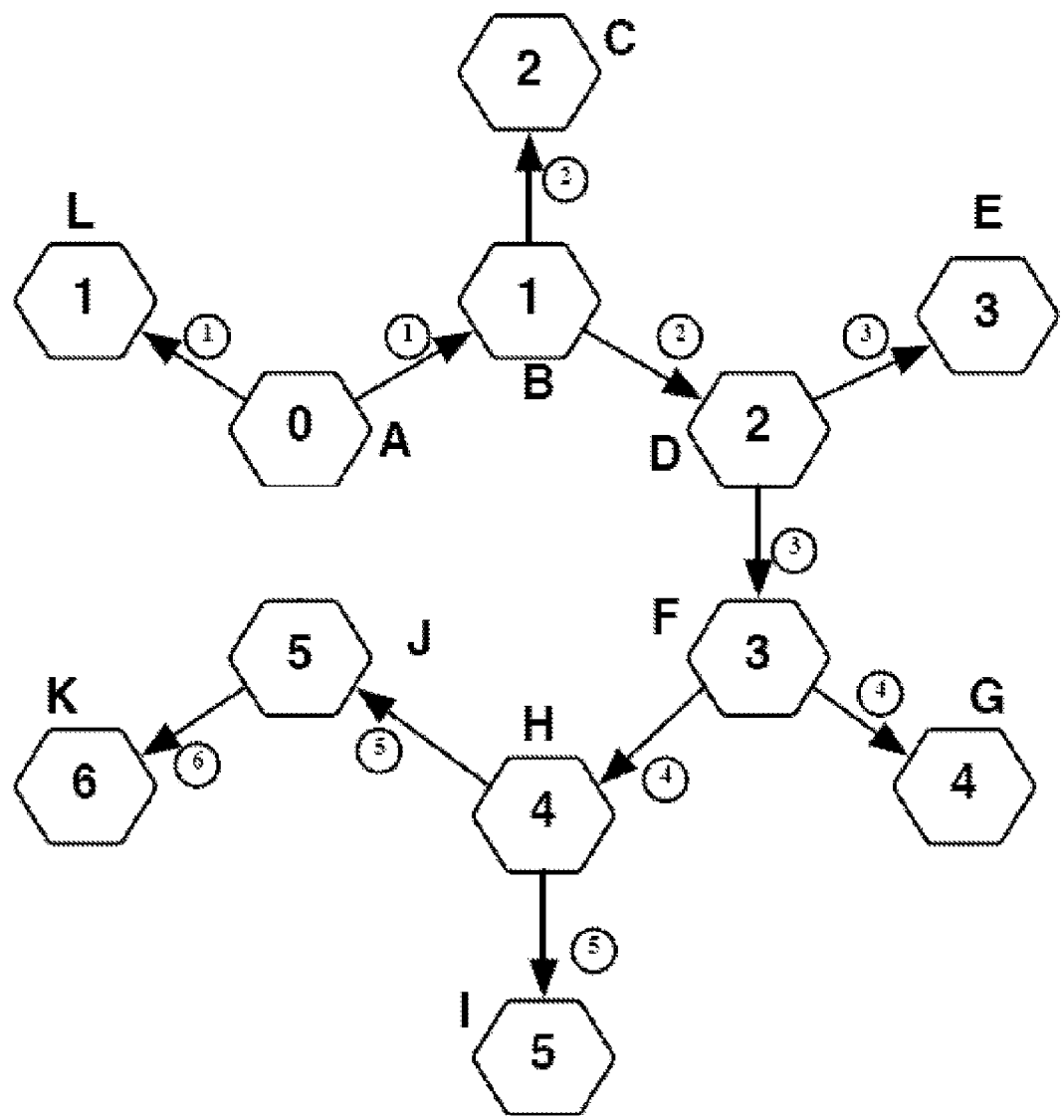
FIGS. 7A and 7B illustrate an example of tree-modifications resulting from the insertion of a link between two nodes in a network.
Figure 7B:
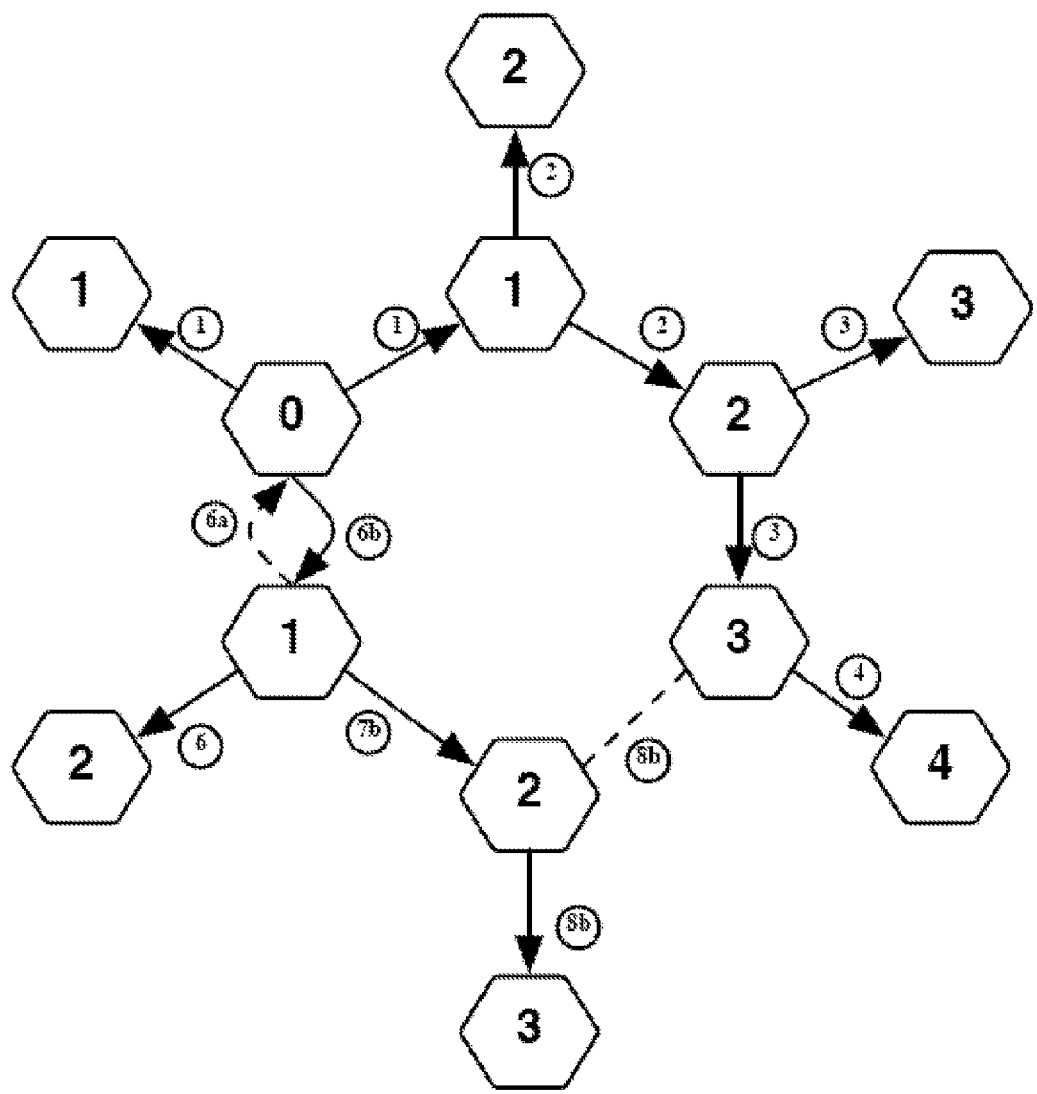

FIGS. 7A and 7B illustrate an example of tree modifications resulting from the insertion of a link between two nodes in a network. FIG. 7A illustrates a tree rooted at node A when the link from A to J is initially absent. FIG. 7B illustrates the tree after a link from A to J has been inserted and the tree repair protocol is complete. The letter to the side of each node is the node's label. The number in the center of the node is its path-cost to the root through its root-ward port (i.e., how many hops it is away from node A). The small circles with numbers indicate notifications between nodes.

When the link between nodes A and J is added, tree-update notification 6a, identifying a tree rooted at node A, is sent from node A to node J. Node A sends tree-update notification 6b, identifying a tree rooted at node A, to node J. Messages 6a and 6b can be sent in any order. Node A rejects tree-update notification 6a by sending back a pruned-port status notification, because it already has a shorter path to the root (it is the root). Node J accepts the path proposed by tree-update notification 6b by sending back a reachable port-status notification. Node J then changes its root-ward port, updates its path-cost to 1 (because the path-cost in the tree-update notification from node A was 0, and the cost of the path from node A to node J is 1), and sends a tree-update notification to node H that specifies a from-there cost of 1. Node J then continues to processes messages from direction K, which if they were intended for node A are sent in the new root-ward direction through node A.

Node H does the same thing as Node J, except it updates its path-cost to 2 and sends tree-update notifications to its neighbors F and I identifying a from-there cost of 2.

Node F receives a tree-update notification with a from-there cost of 2, which after being updated to reflect the cost of getting from node H to node F, would be equal to the path-cost it already has in its routing table for that tree. Therefore, node F sends a pruned port-status notification back to H.

Nodes G, I and K are unaffected, and do not necessarily receive any notifications as the tree is reconfigured.

The tree has now been reconfigured as illustrated in FIG. 7B.

In some implementations, when a connection is removed from a tree and a node's root-ward port for a given tree is no longer active, the node initiates a tree-healing procedure to determine a new path to the root for the given tree. All tree-healing is done from local knowledge and/or the sharing of knowledge as a result of communication between the nodes.

There are a number of reasons a connection through a port can be removed and the port can become inactive. The node connected through the port may have died, or the link itself may have died. The link loss can be local (e.g., the cable is unplugged), or non-local (e.g., a heartbeat is not acknowledged). If the node determines that link loss is local, then the node may begin the healing operation immediately. If the node determines that the link loss is non-local, the node may retry some specified number of times before initiating the healing operation.

As soon as the node determines it has lost its root-ward connection, it may send a notification message to any higher-level functions which have subscribed to immediate notification of failures on this node. The node can also verify that the root-ward port is no longer active by performing a program of retry or reconfiguration operations. If the port comes back up during the verification process, the node can send a resume notification to any higher level functions it had previously notified to inform them that the connection is back up. If the connection does not come back up during the verification process, the node can initiate the healing process.

If there is at least one pruned port, the node heals the tree by selecting the pruned port with the shortest path to the root (e.g., the next port in the order of ports). Otherwise, the node heals the tree by performing a leaf-ward healing operation.

If the node has at least one pruned port, it begins healing by selecting its pruned port with the shortest path to the root. The node can then verify the status of the selected port by sending at least one test message, and receiving at least one test reply. The node then sets the selected port as its root-ward port and sends a tree-update notification on all of its non-root-ward ports notifying them of the new path to the root. The node can then update the order of its ports to reflect the new root-ward port. Finally, the node can send a port-status notification through its new root-ward port to notify its new parent that the node is its child.

Figure 8A:
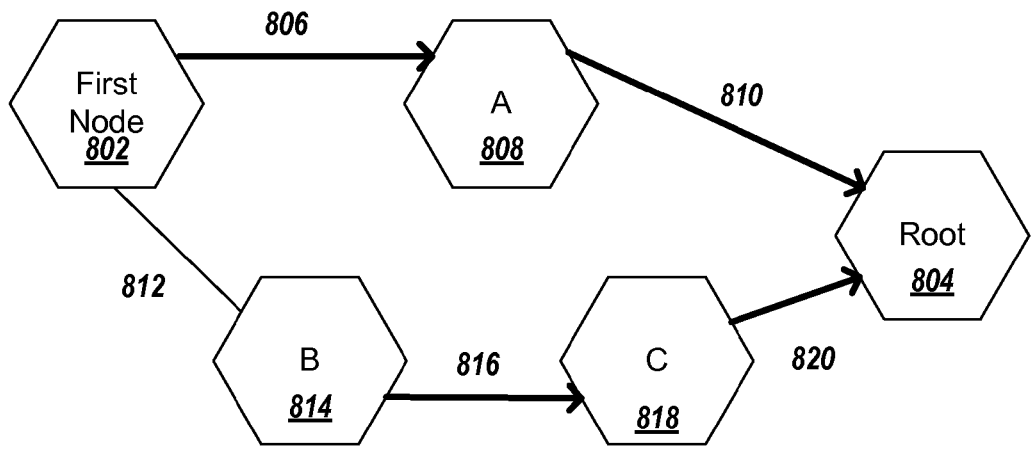
FIGS. 8A, 8B and 8C illustrate an example of pruned healing showing the status of the links between nodes.
Figure 8B:
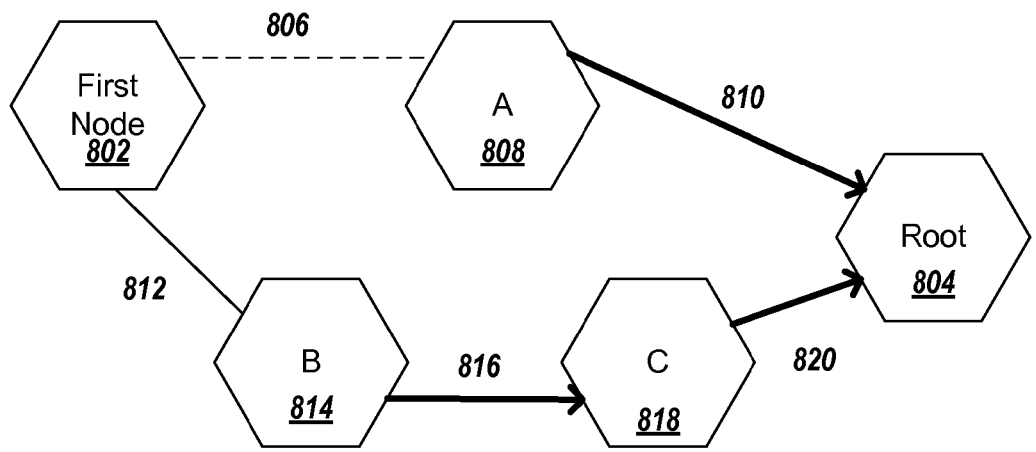
Figure 8C:
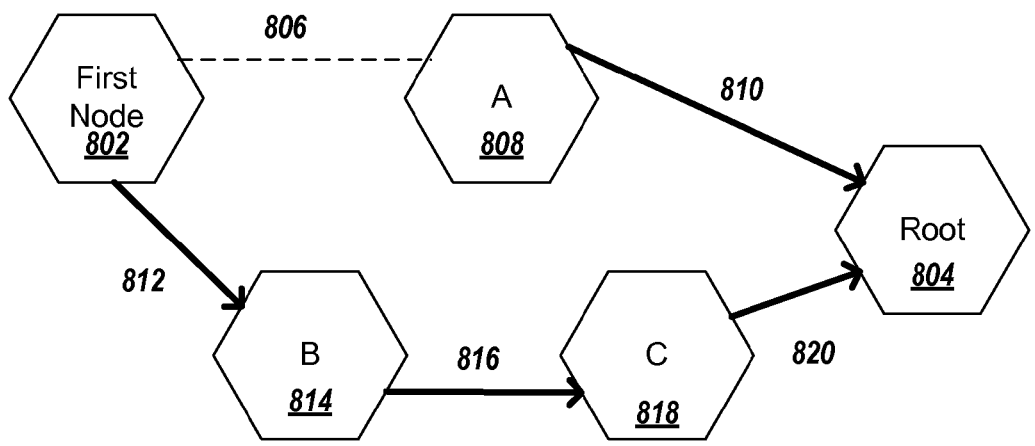

FIGS. 8A-8C illustrate an example of pruned healing showing the status of the links between nodes. In FIGS. 8A-8C, links on root-ward paths are shown with thick lines, links on pruned paths are shown with thin lines, and disconnected links are shown with dashed lines. Arrows on the lines indicate the root-ward direction of each link. FIG. 8A illustrates the initial state of the network, where the first node 802 has a path to the root node 804 through link 806 to node A 808 and through link 810 to the root node 804. The first node 802 also has a pruned path to the root node 804 through link 812 to node B 814 through link 816 to node C 818 through link 820 to the root node 804. FIG. 8B illustrates an intermediate state of the network after link failure: the link 806 between the root node 804 and node A 808 is severed. FIG. 8C illustrates the final state of the network after pruned healing is complete. The first node 802 has selected its formerly pruned port on the link 812 as its root-ward port and the tree-healing is complete.

If a healing node does not have any pruned ports, it begins leaf-ward healing. A node's leaf-ward port can be leaf-ward for one of two reasons. First, the node connected through the port could have no other way of reaching the root. Second, the connected node could have another way of reaching the root, but the healing node is unaware of it, for example, because a tree-update notifications is still flowing in the network and has not yet reached the healing node, the tree-update notification was truncated at some discovery depth which caused the tree-update notification to stop before it reached the healing node, or the connected node pruned the alternative path without notifying the healing node.

Nodes are unable to distinguish between the above situations. Therefore, when a node trying to repair a tree exhausts its supply of pruned ports, it turns to its leaf-ward ports to ascertain if any of its descendants know of an alternative path to the root.

There are potentially three roles nodes can play in leaf-ward healing: sender, receiver, and intermediate. The sender node is the node that has lost its path to the root through its root-ward port and is seeking a new path to the root. The receiver node is a node that has an alternative path to the root through a pruned port. The intermediate nodes forward notifications to and from sender and receiver. The terms sender, receiver, and intermediate nodes denote a god's eye view of the graph. However, while a node knows its own role, it may not know which nodes are playing the other roles. These terms are used as a convenience for describing the system as a whole.

The first action when starting leaf-ward healing is for the sender node to send out a path-request through its leaf-ward ports. In some implementations, the sender sends out a path-request on all its leaf-ward ports. In other implementations, the sender sends out a path-request on a subset of its leaf-ward ports, for example, to the leaf-ward port most likely to lead to a path to the root. The leaf-ward port most likely to lead to a path to the root can be determined by the node, for example, by selecting the leaf-ward port that is most often the root-ward port for the other trees for which the node stores tree-specific data. The leaf-ward port most likely to lead to a path to the root can also be determined by maintaining a history of which ports were at one time root-ward ports for the tree and selecting the port that was most recently the root-ward port for the tree.

The path-request traverses each child node in turn, passing from each node's root-ward port to its leaf-ward ports (or a subset of its leaf-ward ports). When the path-request reaches a leaf node, the leaf node sends an acknowledgement returning a null (not found) status. When the path-request reaches a virtual leaf node (i.e., a node with one or more pruned ports), the virtual leaf node becomes a receiver and returns a request-acknowledgement specifying the lowest path-cost of the path-costs through its pruned ports. In some implementations, the request-acknowledgement also includes an identifier for the receiver.

When an intermediate node has received a response on all its ports, and at least one of these responses is a request-acknowledgement, it sends a request-acknowledgment through its root-ward port for the tree indicating a from-there cost which is the shortest path-cost from the intermediate node. If the intermediate node only receives null acknowledgements, it sends a null acknowledgement through its root-ward port for the tree. This continues in turn until all request-acknowledgements arrive at the sender node.

If the sender node only receives null acknowledgements, the node determines that it has no paths to the root and enters the healing state. The healing state waits for the original root-ward port to return to normal operation, while also waiting for a tree-update notification for the tree from one of the descendants of the sender node.

If the sender node receives a request-acknowledgement through at least one of its ports, it selects the port that received a request-acknowledgement with the shortest from-here cost. Each from-here cost is determined from the from-there cost in each respective request-acknowledgment by adding a cost of traveling through the respective port. This added cost can be 1 if the path-cost is a hopcount, or a path-cost based on information obtained from the resiliency web.

The sender sends out a change-path notification to its selected receiver whose request acknowledgement had the shortest path to the root. In some implementations, the change-path notification is sent much as the path-request was sent (i.e., through the leaf-ward port). In some implementations, the change-path notification is sent by identifying a tree whose root is the receiver and sending the change-path notification through the root-ward port for that tree.

At this point, the sender still regards the receiver as a descendant, and the receiver regards the sender as an ancestor.

The final step is for the receiver to send a path-changed notification back to the sender. The path-changed notification is the notification that causes the reconfiguration of the tree: as the path-changed notification is passed from node to node, each node forwards the path-changed notification through its current root-ward port and immediately sets the state of its current root-ward port to leaf-ward and sets the state of the port through which the path-changed notification was received to root-ward, thus reversing the direction of the link. Any other ports with a leaf-ward state remain the same, any other ports with a pruned state remain the same. The path-changed notification therefore passes through the chain of nodes from receiver to sender, causing a swapping of the roles of predecessor and descendant for each node on the path.

The healing operation is a two-phase process because in a network with many links breaking at the same time, each node that loses its root-ward connection should remain responsible for seeking a new root-ward direction. Therefore, the original tree segment is maintained until the sender can be certain that the receiver has a valid path to the root.

In some implementations, the path-requests serve as an alert that tree repair is underway, and that higher level operations (for example, sending messages on the broken tree) should be temporarily suspended. In these implementations, an "all clear" message can be sent, for example, once the tree repair is complete.

Figure 9A:
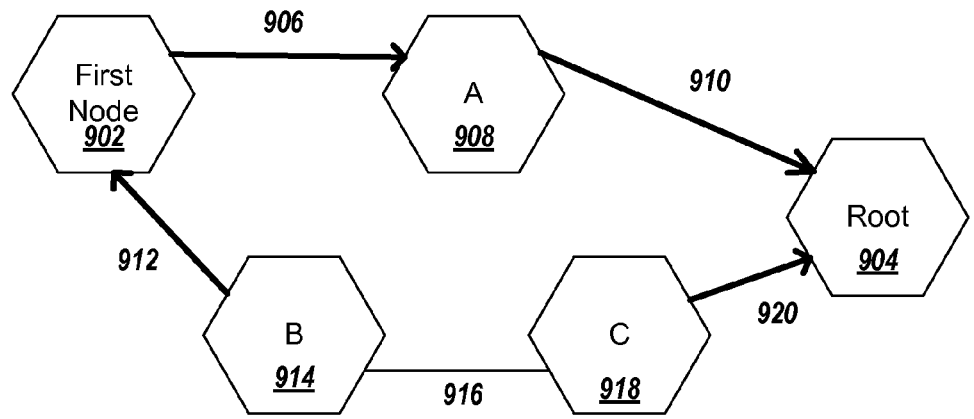
FIGS. 9A, 9B and 9C illustrate an example of leaf-ward healing showing the status of the links between nodes.
Figure 9B:
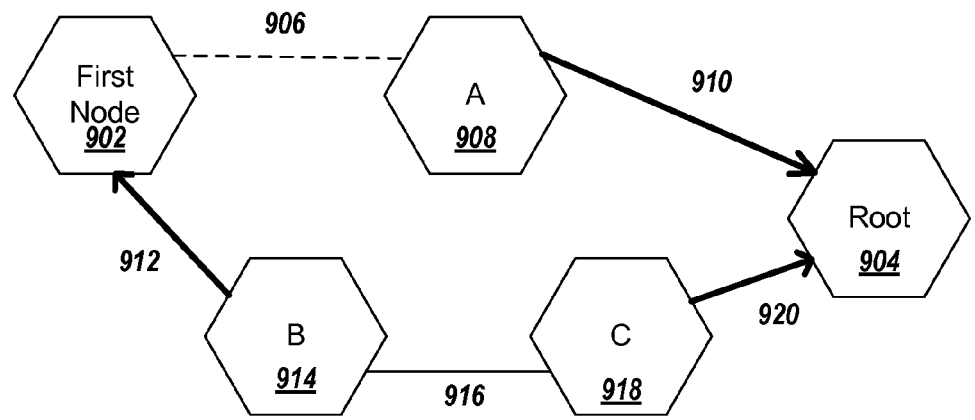
Figure 9C:
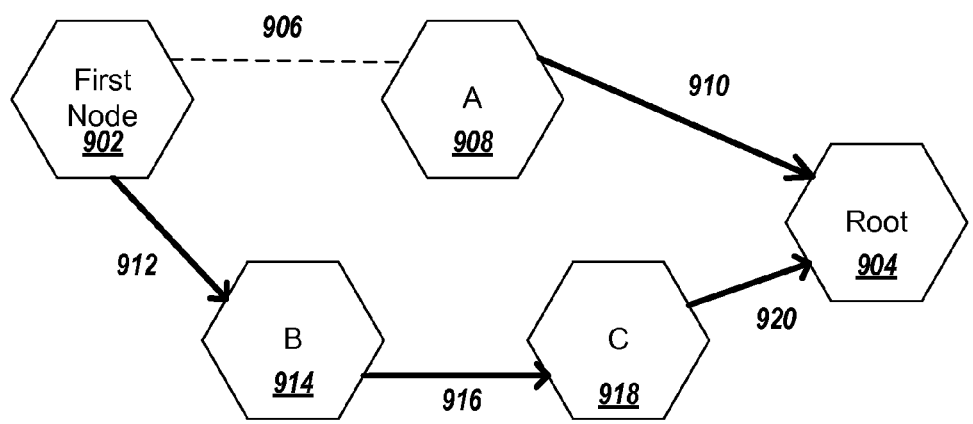

FIGS. 9A-9C illustrate an example of leaf-ward healing showing the status of the links between nodes. In FIGS. 9A-9C, thick lines indicate links along a root-ward path, i.e., a path from a root-ward port, thin lines represent links in a pruned path, i.e., a path from a pruned port, and dashed lines represent disconnected links. Arrows on the lines indicate the root-ward direction of each link. FIG. 9A illustrates the initial state of the network, where the first node 902 has a path to the root 904 through link 906 to node A 908 through link 910 to the root 904. Node B 914 is leaf-ward of the first node 902, because node B 914's path to the root 904 goes through the first node 902. Node B also has a pruned path 916.

FIG. 9B illustrates the state of the network when link 906 on the path from the root 904 to the first node 902 is disconnected. The first node 902 has lost its root-ward path because its root-ward port is no longer active. The first node has no pruned ports, and thus begins leaf-ward healing by sending a path-request through its leaf-ward port through link 912. The first node 902 remains the parent node for node B 914 as the two nodes exchange messages during healing, until node B sends back a path-changed notification through link 912.

FIG. 9C illustrates the final state of the network, where the first node 902 has a path to the root node 904 through link 912 to node B 914, through link 916 to node C 918, and through link 920 to the root node 904.

As stated earlier, the trees built using the tree-growing protocol can be used to support a message routing protocol. Each node can route messages based on the message header and the node's tree-specific data. The message header contains information about the message, e.g., what node it is intended for, any additional information needed to guide the message toward its destination, and what to do if the destination cannot be reached.

In some implementations, when a node receives a message intended for a second node, the node identifies a tree rooted at the second node, and passes the message through its root-ward port for the second node's tree.

In some implementations, a node performs other tree-specific message operations, for example, flood, tree-cast, branch-cast, and leaf-cast. Flood occurs when a message is sent through all ports of all nodes of the tree, except for the ports the message came in on. Tree-cast occurs when a message is sent through all non-pruned ports in the tree. Branch-cast occurs when a message is sent through all leaf-ward ports of the tree. Leaf-cast occurs when a message is sent to all leaf nodes of the tree. The flood operation can be used by nodes in any state relative to the tree. The tree-cast and branch-cast operations can be used by nodes in the meta-stable or stable state relative to the tree. The leaf-cast can be used by nodes in the stable state relative to the tree.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a non-transitory computer-readable medium comprising a processor and a program for execution by, or to control the operation of, data processing apparatus. The non-transitory computer-readable medium can be a machine-readable storage device, a machine-readable storage substrate, a random or serial access memory device, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more network nodes executing one or more computer programs to perform functions by operating on input data and generating output. A network node can be implemented in any form of data processing apparatus, device, and machine with data communication capability and will generally be based on a computer or multiple computers. A network node will generally include, in addition to hardware, code that constitutes a protocol stack, and may also include processor firmware, code that creates an execution environment, a file system, a database management system, an operating system, or a combination of one or more of them. A network node can be, for example, one or more network attached storage devices, routers, switches, servers, client devices, computers, or clusters of computers.

Processors suitable for the execution of a computer program in a node include, by way of example, both general and special purpose microprocessors, and any one or more processors of any kind of digital computer. Generally, a processor will receive instructions and data from a read-only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Non-transitory Computer-readable media comprising a processor suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Also, in certain implementations, additional information can be used by the nodes in growing trees, repairing trees, and routing messages. Accordingly, other embodiments are within the scope of the following claims.

What is claimed is:

1. A method performed by a first node, the first node comprising one or more computers and a plurality of active ports, the method comprising:
   (a) maintaining data representing a tree-specific status for each of a plurality of trees, each of the plurality of trees having a distinct root,
      where the status for each tree includes a node state for the first node, a port state for each of the active ports, and a path-cost,
         where the node state identifies the first node as being one of discoverable, reachable, meta-stable, or stable,
         where the port state for each port is one of root-ward, pruned, leaf-ward, or undiscovered, and the port state identifies each port as being a root-ward port, a pruned port, a leaf-ward port, or an undiscovered port, respectively, and where no more than one port is a root-ward port, and
         where the path-cost represents a cost of reaching the root through the root-ward port;
   (b) receiving a first tree-update notification through a first active port, where the first tree-update notification identifies a first tree and a first from-there cost, and in response to receiving the first tree-update notification:
      determining a first from-here cost from the first from-there cost;
      updating the status for the first tree by performing the following operations:
         (i) if the first from-here cost is less than the path-cost:
            setting the path-cost to be equal to the first from-here cost,
            if a port distinct from the first active port is the root-ward port, changing the port state of the port to pruned,
            if the first active port is not the root-ward port, changing the state of the first port to root-ward,
            setting the node state to reachable,
            sending a first port-status notification identifying the first tree and indicating a first port status of reachable through the first port, where the first port-status notification corresponds to the first tree-update notification, and
            sending a second tree-update notification through all active ports other than the first port, where the second tree-update notification identifies the first tree and the first from-here cost; or
         (ii) if the first from-here cost is not less than the first path-cost:
            sending a second port-status notification identifying the first tree and indicating a second port status of pruned through the first active port once the node state is stable, where the second port-status notification corresponds to the first tree-update notification;
   (c) receiving a third port-status notification through a second active port, where the second port-status notification identifies a second tree and indicates a third port status, where the third port-status notification corresponds to a most recently sent tree-update notification for the second tree, and where the third port status is one of reachable, meta-stable, stable, or pruned, and in response to receiving the third port-status notification:
      updating the status for the second tree by setting the port state of the second active port to pruned if the third port status is pruned, and otherwise setting the port state of the second active port to be leaf-ward; and
      setting the node state for the second tree to reachable if a port-status notification corresponding to a most recently sent tree-update has not been received through each non root-ward port, otherwise setting the node state for the second tree to stable if a last port state notification corresponding to the most recently sent tree-update notification received through each non root-ward port indicates a port status of stable, and otherwise setting the node state to meta-stable; and
   (d) in response to a change in the node state for any tree, sending a fourth port-status notification corresponding to a most recently received tree-update notification through the root-ward port for the tree, where the fourth port-status notification identifies the tree and indicates a fourth port status, and where the fourth port status is stable if the node state is stable, where the fourth port status is meta-stable if the node state is meta-stable, and where otherwise the fourth port status is reachable.

2. The method of claim 1, further comprising:
   determining that a formerly inactive third port has become active;
   adding the third port to the plurality of active ports;
   updating the node state to reachable for each tree in the plurality of trees; and
   sending a third tree-update notification through the third port for each tree in the plurality of trees, where the third tree-update notification identifies the respective tree and the path-cost for the respective tree.

3. The method of claim 1, wherein the status for each tree in the plurality of trees further indicates an ordering of the pruned ports, the method further comprising:
   determining that a fourth port is no longer active;
   identifying a third tree, where the fourth port is the root-ward port for the third tree; if the third tree has one or more pruned ports, selecting a fifth active port from the one or more pruned ports and causing the fifth active port to be the root-ward port for the third tree, where the fifth active port is selected according to the ordering for the third tree; and
   if the third tree has no pruned ports, performing the following operations:
      sending a first path-request identifying the third tree through all leaf-ward ports for the third tree,
      receiving a first request-acknowledgement through one or more leaf-ward ports for the third tree, where the first request-acknowledgment is a response to the path-request, and where the first request acknowledgement includes a second from-there cost,
      determining a second from-here cost for each first request-acknowledgement from each second from-there cost;
      identifying a sixth active port, where the first request-acknowledgement received through the sixth active port has a lowest second from-here cost of the second from-here costs of all of the first request-acknowledgements;
      sending a first change-path notification through the sixth active port, where the first change-path notification is a response to the first request-acknowledgement received through the sixth active port;

receiving a first path-changed notification through the sixth active port, where the first path-changed notification is a response to the first change-path notification; and causing the sixth active port to be the root-ward port for the third tree.

4. The method of claim 1, wherein the status for each tree in the plurality of trees further indicates a pruned path-cost for each pruned port, where the pruned path-cost represents a cost of reaching the root through the pruned port, the method further comprising:

(e) receiving a second path-request identifying a fourth tree through a currently root-ward port, where the currently root-ward port is the root-ward port for the fourth tree, and where the fourth tree has at least one pruned or leaf-ward port;

(f) if the fourth tree has at least one pruned port, performing the following operations:

identifying a seventh active port, where the seventh active port is a pruned port with a lowest pruned path-cost for the fourth tree;

sending a second request-acknowledgement through the currently root-ward port, where the second request-acknowledgement is a response to the second path-request, and where the second request-acknowledgement includes the pruned path-cost for the seventh active port for the fourth tree;

receiving a second change-path notification through the currently root-ward port, where the second change-path notification is a response to the second request-acknowledgement, and updating the status for the fourth tree in response to the second change-path notification by setting the status of the currently root-ward port to leaf-ward, setting the status of the seventh active port to root-ward, and setting the path-cost to the pruned path-cost for the seventh active port for the fourth tree;

sending a second path-changed notification through the currently root-ward port, where the second path-changed notification is a response to the second change-path notification;

(g) if the fourth tree has no pruned ports, performing the following operations:

forwarding the second path-request to all leaf-ward ports;

receiving a third request-acknowledgement through one or more leaf-ward ports in response to the path-request, where each third request-acknowledgement includes a third from-there cost;

determining a third from-here cost for each third request-acknowledgement from the third from-there cost of each third request-acknowledgement;

identifying an eighth active port, where the third request-acknowledgement received through the eighth active port has a lowest from-here cost of all of the third request-acknowledgements;

sending a fourth request-acknowledgement through the currently root-ward port, where the fourth request-acknowledgement is a response to the second path-request, and where the fourth request-acknowledgement includes the third from-here cost of the third-request acknowledgement received through the eighth active port;

receiving a third change-path notification through the currently root-ward port and forwarding the third change-path notification through the eighth active port, where the third change-path notification is a response to the fourth request-acknowledgement;

receiving a third path-changed notification through the eighth active port, where the third path-changed notification is a response to the third change-path notification, and updating the status of the fourth tree in response to the third path-changed notification by setting the status of the currently root-ward port to leaf-ward, setting the status of the eighth active port to root-ward and setting the path-cost to the third from-here cost of the third request acknowledgement received through the eighth active port; and forwarding the third path-changed notification through the currently root-ward port.

5. The method of claim 1, further comprising:

receiving a message in the first node, the message identifying an intended recipient node;

identifying a fifth tree, where the intended recipient node is the root of the fifth tree; and forwarding the message through the root-ward port for the fifth tree.

6. A non-transitory computer program product comprising a processor with encoded program instructions on a non-transitory computer readable medium, operable to cause a first node comprising one or more computers and a plurality of active ports to perform operations comprising:

(a) maintaining data representing a tree specific status for each of a plurality of trees, each of the plurality of trees having a distinct root, where the status for each tree includes a node state for the first node, a port state for each of the active ports, and a path-cost, where the node state identifies the first node as being one of discoverable, reachable, meta-stable, or stable, where the port state for each port is one of root-ward, pruned, leaf ward, or undiscovered, and the port state identifies each port as being a root-ward port, a pruned port, a leaf ward port, or an undiscovered port, respectively, and where no more than one port is a root-ward port, and where the path-cost represents a cost of reaching the root through the root-ward port;

(b) receiving a first tree-update notification through a first active port, where the first tree-update notification identifies a first tree and a first from-there cost, and in response to receiving the first tree-update notification:

determining a first from-here cost from the first from-there cost;

updating the status for the first tree by performing the following operations:

(i) if the first from-here cost is less than the path-cost:
setting the path-cost to be equal to the first from-here cost, if a port distinct from the first active port is the root-ward port, changing the port state of the port to pruned, if the first active port is not the root-ward port, changing the state of the first port to root-ward, setting the node state to reachable, sending a first port-status notification identifying the first tree and indicating a first port status of reachable through the first port, where the first port-status notification corresponds to the first tree-update notification, and sending a second tree-update notification through all active ports other than the first port, where the second tree-update notification identifies the first tree and the first from-here cost; or (ii) if the first from-here cost is not less than the first path-cost:

sending a second port-status notification identifying the first tree and indicating a second port status of pruned through the first active port once the node state is stable, where the second port-status notification corresponds to the first tree-update notification;

(c) receiving a third port-status notification through a second active port, where the second port-status notification identifies a second tree and indicates a third port status, where the third port-status notification corresponds to a most recently sent tree-update notification for the second tree, and where the third port status is one of reachable, meta-stable, stable, or pruned, and in response to receiving the third port-status notification:

updating the status for the second tree by setting the port state of the second active port to pruned if the third port status is pruned, and otherwise setting the port state of the second active port to be leaf ward;

setting the node state for the second tree to reachable if a port-status notification corresponding to a most recently sent tree-update has not been received through each non root-ward port, otherwise setting the node state for the second tree to stable if a last port state notification corresponding to the most recently sent tree-update notification received through each non root-ward port indicates a port status of stable, and otherwise setting the node state to meta-stable; and (d) in response to a change in the node state for any tree, sending a fourth port-status notification corresponding to a most recently received tree-update notification through the root-ward port for the tree, where the fourth port-status notification identifies the tree and indicates a fourth port status, and where the fourth port status is stable if the node state is stable, where the fourth port status is meta-stable if the node state is meta-stable, and where otherwise the fourth port status is reachable.

7. The computer program product of claim 6, further operable to cause the first node to perform operations comprising:

determining that a formerly inactive third port has become active;

adding the third port to the plurality of active ports;

updating the node state to reachable for each tree in the plurality of trees; and sending a third tree-update notification through the third port for each tree in the plurality of trees, where the third tree-update notification identifies the respective tree and the path-cost for the respective tree.

8. The computer program product of claim 6, wherein the status for each tree in the plurality of trees further indicates an ordering of the pruned ports, the computer program product further operable to cause the first node to perform operations comprising:

determining that a fourth port is no longer active;

identifying a third tree, where the fourth port is the root-ward port for the third tree;

if the third tree has one or more pruned ports, selecting a fifth active port from the one or more pruned ports and causing the fifth active port to be the root-ward port for the third tree, where the fifth active port is selected according to the ordering for the third tree; and if the third tree has no pruned ports, performing the following operations:

sending a first path request identifying the third tree through all leaf ward ports for the third tree, receiving a first request acknowledgement through one or more leaf ward ports for the third tree, where the first request acknowledgment is a response to the path request, and where the first request acknowledgement includes a second from-there cost, determining a second from-here cost for each first request acknowledgement from each second from-there cost;

identifying a sixth active port, where the first request acknowledgement received through the sixth active port has a lowest second from-here cost of the second from-here costs of all of the first request acknowledgements;

sending a first change path notification through the sixth active port, where the first change path notification is a response to the first request acknowledgement received through the sixth active port;

receiving a first path changed notification through the sixth active port, where the first path changed notification is a response to the first change path notification; and causing the sixth active port to be the root-ward port for the third tree.

9. The computer program product of claim 6, wherein the status for each tree in the plurality of trees further indicates a pruned path-cost for each pruned port, where the pruned path-cost represents a cost of reaching the root through the pruned port, the computer program product further operable to cause the first node to perform operations comprising:

(e) receiving a second path request identifying a fourth tree through a currently root-ward port, where the currently root-ward port is the root-ward port for the fourth tree, and where the fourth tree has at least one pruned or leaf ward port;

(f) if the fourth tree has at least one pruned port, performing the following operations:

identifying a seventh active port, where the seventh active port is a pruned port with a lowest pruned path-cost for the fourth tree;

sending a second request acknowledgement through the currently root-ward port, where the second request acknowledgement is a response to the second path request, and where the second request acknowledgement includes the pruned path-cost for the seventh active port for the fourth tree;

receiving a second change path notification through the currently root-ward port, where the second change path notification is a response to the second request acknowledgement, and updating the status for the fourth tree in response to the second change path notification by setting the status of the currently root-ward port to leaf ward, setting the status of the seventh active port to root-ward, and setting the path-cost to the pruned path-cost for the seventh active port for the fourth tree;

sending a second path changed notification through the currently root-ward port, where the second path changed notification is a response to the second change path notification;

(g) if the fourth tree has no pruned ports, performing the following operations:

forwarding the second path request to all leaf ward ports;

receiving a third request acknowledgement through one or more leaf ward ports in response to the path request, where each third request acknowledgement includes a third from-there cost;

determining a third from-here cost for each third request acknowledgement from the third from-there cost of each third request acknowledgement;

identifying an eighth active port, where the third request acknowledgement received through the eighth active port has a lowest from-here cost of all of the third request acknowledgements;

sending a fourth request acknowledgement through the currently root-ward port, where the fourth request acknowledgement is a response to the second path request, and where the fourth request acknowledgement includes the third from-here cost of the third request acknowledgement received through the eighth active port;

receiving a third change path notification through the currently root-ward port and forwarding the third change path notification through the eighth active port, where the third change path notification is a response to the fourth request acknowledgement;

receiving a third path changed notification through the eighth active port, where the third path changed notification is a response to the third change path notification, and updating the status of the fourth tree in response to the third path changed notification by setting the status of the currently root-ward port to leaf ward, setting the status of the eighth active port to root-ward and setting the path-cost to the third from-here cost of the third request acknowledgement received through the eighth active port; and forwarding the third path changed notification through the currently root-ward port.

10. The computer program product of claim 6, further operable to cause the first node to perform operations comprising:

receiving a message, the message identifying an intended recipient node;

identifying a fifth tree, where the intended recipient node is the root of the fifth tree; and forwarding the message through the root-ward port for the fifth tree.

11. A system comprising:

a plurality of nodes, where each node comprises one or more computers, where each node has a plurality of active ports, where at least one port of each node is operatively coupled to a port of a node in the plurality of nodes, and where each node is configured to perform operations comprising:

(a) maintaining data representing a tree-specific status for each of a plurality of trees, each of the plurality of trees having a distinct root, where the status for each tree includes a node state for the node, a port state for each of the active ports, and a path-cost, where the node state identifies the node as being one of discoverable, reachable, meta-stable, or stable, where the port state for each port is one of root-ward, pruned, leaf-ward, or undiscovered, and the port state identifies each port as being a root-ward port, a pruned port, a leaf-ward port, or an undiscovered port, respectively, and where no more than one port is a root-ward port, and where the path-cost represents a cost of reaching the root through the root-ward port;

(b) receiving a first tree-update notification through a first active port, where the first tree-update notification identifies a first tree and a first from-there cost, and in response to receiving the first tree-update notification:

determining a first from-here cost from the first from-there cost;

updating the status for the first tree by performing the following operations:

(i) if the first from-here cost is less than the path-cost:

setting the path-cost to be equal to the first from-here cost, if a port distinct from the first active port is the root-ward port, changing the port state of the port to pruned, if the first active port is not the root-ward port, changing the state of the first port to root-ward, setting the node state to reachable, sending a first port-status notification identifying the first tree and indicating a first port status of reachable through the first port, where the first port-status notification corresponds to the first tree-update notification, and sending a second tree-update notification through all active ports other than the first port, where the second tree-update notification identifies the first tree and the first from-here cost; or (ii) if the first from-here cost is not less than the first path-cost:

sending a second port-status notification identifying the first tree and indicating a second port status of pruned through the first active port once the node state is stable, where the second port-status notification corresponds to the first tree-update notification;

(c) receiving a third port-status notification through a second active port, where the second port-status notification identifies a second tree and indicates a third port status, where the third port-status notification corresponds to a most recently sent tree-update notification for the second tree, and where the third port status is one of reachable, meta-stable, stable, or pruned, and in response to receiving the third port-status notification:

updating the status for the second tree by setting the port state of the second active port to pruned if the third port status is pruned, and otherwise setting the port state of the second active port to be leaf-ward;

setting the node state for the second tree to reachable if a port-status notification corresponding to a most recently sent tree-update has not been received through each non root-ward port, otherwise setting the node state for the second tree to stable if a last port state notification corresponding to the most recently sent tree-update notification received through each non root-ward port indicates a port status of stable, and otherwise setting the node state to meta-stable; and (d) in response to a change in the node state for any tree, sending a fourth port-status notification corresponding to a most recently received tree-update notification through the root-ward port for the tree, where the fourth port-status notification identifies the tree and indicates a fourth port status, and where the fourth port status is stable if the node state is stable, where the fourth port status is meta-stable if the node state is meta-stable, and where otherwise the fourth port status is reachable.

12. The system of claim 11, wherein each node is further configured to perform operations comprising:
  determining that a formerly inactive third port has become active;
  adding the third port to the plurality of active ports;
  updating the node state to reachable for each tree in the plurality of trees; and
  sending a third tree-update notification through the third port for each tree in the plurality of trees, where the third tree-update notification identifies the respective tree and the path-cost for the respective tree.

13. The system of claim 11, wherein the status for each tree in the plurality of trees further indicates an ordering of the pruned ports, wherein each node is further configured to perform operations comprising:
  determining that a fourth port is no longer active;
  identifying a third tree, where the fourth port is the root-ward port for the third tree;
  if the third tree has one or more pruned ports, selecting a fifth active port from the one or more pruned ports and causing the fifth active port to be the root-ward port for the third tree, where the fifth active port is selected according to the ordering for the third tree; and
  if the third tree has no pruned ports, performing the following operations:
    sending a first path-request identifying the third tree through all leaf-ward ports for the third tree,
    receiving a first request-acknowledgement through one or more leaf-ward ports for the third tree, where the first request-acknowledgment is a response to the path-request, and where the first request acknowledgement includes a second from-there cost,
    determining a second from-here cost for each first request-acknowledgement from each second from-there cost;
    identifying a sixth active port, where the first request-acknowledgement received through the sixth active port has a lowest second from-here cost of the second from-here costs of all of the first request-acknowledgements;
    sending a first change-path notification through the sixth active port, where the first change-path notification is a response to the first request-acknowledgement received through the sixth active port;
    receiving a first path-changed notification through the sixth active port, where the first path-changed notification is a response to the first change-path notification; and
    causing the sixth active port to be the root-ward port for the third tree.

14. The system of claim 11, wherein the status for each tree in the plurality of trees further indicates a pruned path-cost for each pruned port, where the pruned path-cost represents a cost of reaching the root through the pruned port, and wherein each node is further configured to perform operations comprising:
  (e) receiving a second path-request identifying a fourth tree through a currently root-ward port, where the currently root-ward port is the root-ward port for the fourth tree, and where the fourth tree has at least one pruned or leaf-ward port;
  (f) if the fourth tree has at least one pruned port, performing the following operations:
    identifying a seventh active port, where the seventh active port is a pruned port with a lowest pruned path-cost for the fourth tree;
    sending a second request-acknowledgement through the currently root-ward port, where the second request-acknowledgement is a response to the second path-request, and where the second request-acknowledgement includes the pruned path-cost for the seventh active port for the fourth tree;
    receiving a second change-path notification through the currently root-ward port, where the second change-path notification is a response to the second request-acknowledgement, and updating the status for the fourth tree in response to the second change-path notification by setting the status of the currently root-ward port to leaf-ward, setting the status of the seventh active port to root-ward, and setting the path-cost to the pruned path-cost for the seventh active port for the fourth tree;
    sending a second path-changed notification through the currently root-ward port, where the second path-changed notification is a response to the second change-path notification;
  (g) if the fourth tree has no pruned ports, performing the following operations:
    forwarding the second path-request to all leaf-ward ports;
    receiving a third request-acknowledgement through one or more leaf-ward ports in response to the path-request, where each third request-acknowledgement includes a third from-there cost;
    determining a third from-here cost for each third request-acknowledgement from the third from-there cost of each third request-acknowledgement;
    identifying an eighth active port, where the third request-acknowledgement received through the eighth active port has a lowest from-here cost of all of the third request-acknowledgements;
    sending a fourth request-acknowledgement through the currently root-ward port, where the fourth request-acknowledgement is a response to the second path-request, and where the fourth request-acknowledgement includes the third from-here cost of the third-request acknowledgement received through the eighth active port;
    receiving a third change-path notification through the currently root-ward port and forwarding the third change-path notification through the eighth active port, where the third change-path notification is a response to the fourth request-acknowledgement;
    receiving a third path-changed notification through the eighth active port, where the third path-changed notification is a response to the third change-path notification, and updating the status of the fourth tree in response to the third path-changed notification by setting the status of the currently root-ward port to leaf-ward, setting the status of the eighth active port to root-ward and setting the path-cost to the third from-here cost of the third request acknowledgement received through the eighth active port; and
    forwarding the third path-changed notification through the currently root-ward port.

15. The system of claim 11, wherein each node is further configured to perform operations comprising:
  receiving a message in the node, the message identifying an intended recipient node;
  identifying a fifth tree, where the intended recipient node is the root of the fifth tree; and
  forwarding the message through the root-ward port for the fifth tree.

* * * * *